F. J. PETROVICS.
TEMPERATURE CONTROLLER.
APPLICATION FILED JULY 17, 1920.
1,374,230.
Patented Apr. 12, 1921.
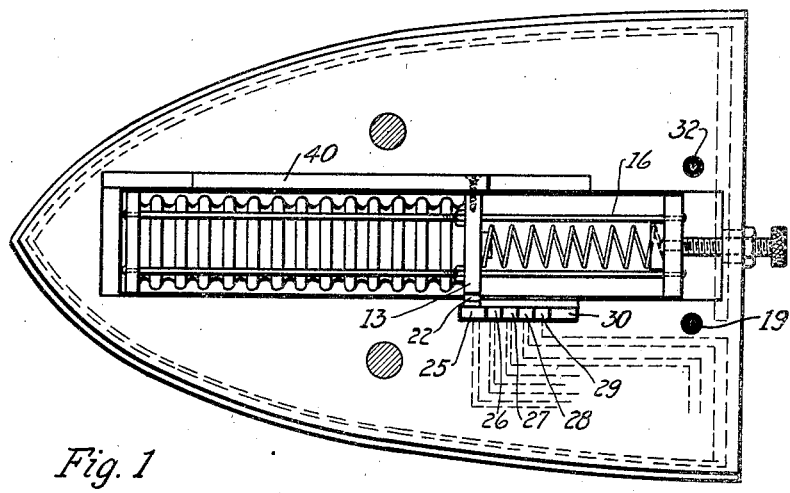
Fig. 1
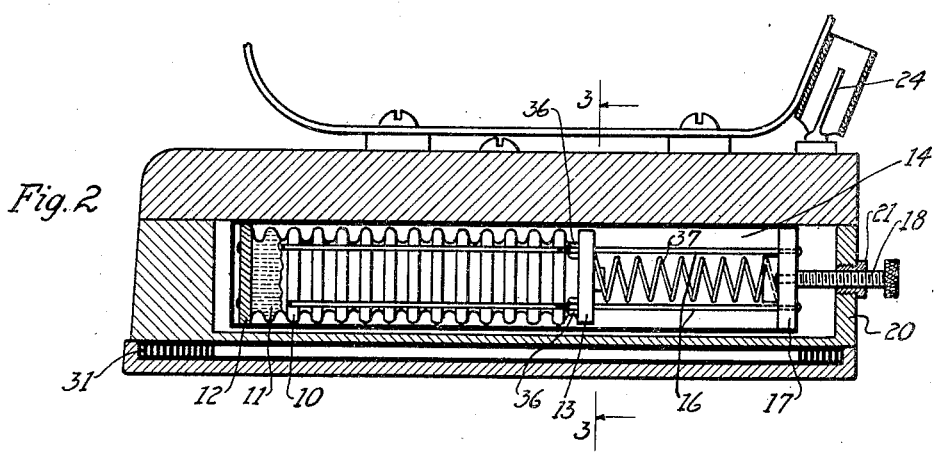
Fig. 2
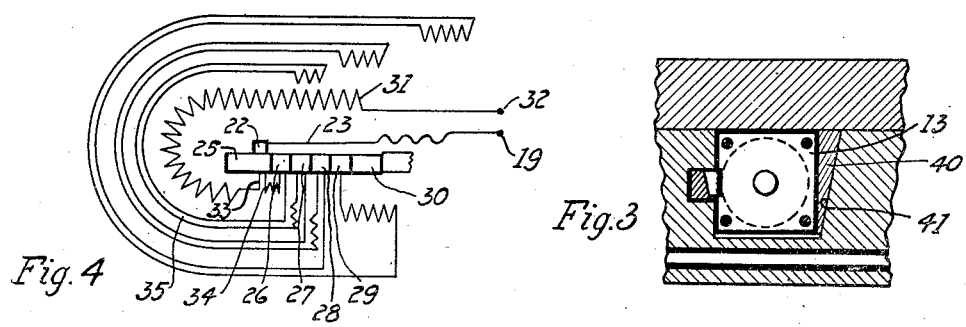
Fig. 4
Fig. 3
INVENTOR:
Fred J. Petrovics
BY: E J Andrews
Atty.

UNITED STATES PATENT OFFICE.

FRED J. PETROVICS, OF CHICAGO, ILLINOIS.

TEMPERATURE-CONTROLLER.

1,374,230.  Specification of Letters Patent.  Patented Apr. 12, 1921.

Application filed July 17, 1920. Serial No. 397,105.

*To all whom it may concern:*

Be it known that I, FRED J. PETROVICS, a citizen of the United States, residing at Chicago, in the county of Cook and State of Illinois, have invented certain new and useful Improvements in Temperature-Controllers, of which the following is a specification.

This invention relates to means for controlling temperatures and particularly for maintaining the temperature of various devices within certain predetermined limits. In the use of certain articles such as sad irons, curling irons, or machines such as mangles, it is frequently found that the temperature of the article rises to an undesirable or dangerous height, and the object of this invention is to provide means for limiting the rise in temperature at the desired amount.

In general, in carrying out my invention, I provide mechanism applicable to electrically heated devices which limits the flow of electric current through the heating device according to the temperature of the device itself, and thereby maintains the temperature of the device within certain predetermined minimum and maximum limits; and at the same time I provide means whereby the temperature limits may be adjusted to suit the requirements of the particular case. Other objects of the invention will be apparent from a consideration of the accompanying drawings and the following description thereof.

While the drawings and description relate to ordinary sad irons, it is to be understood that the invention is equally applicable to various other devices, apparatus and mechanisms.

Of the accompanying drawings, Figure 1 is a plan view of a sad iron, with the upper section thereof removed, which embodies the features of my invention; Fig. 2 is a central, vertical, sectional view of the sad iron; Fig. 3 is a fragmental sectional view along the line 3—3 of Fig. 2 and Fig. 4 is a diagrammatic view of the electric heating elements of the iron.

In carrying out my invention the ordinary form of sad iron may be used, with the electric heating coils embedded therein in any ordinary or suitable manner, it being necessary only that the ends of certain of the coils be suitably connected to the mechanism which is used to control the flow of current through the various coils so as to limit the temperature of the iron, as may be desired. I have indicated in Fig. 1 by the dotted lines the general arrangement of the heating coils, most of the coils, however, being omitted; I have also indicated the manner in which the coils are to be connected to the controlling means; while in Fig. 4 I have shown diagrammatically the relative arrangement of the various coils, particularly with reference to the heating effect that each is to have. In general, it may be understood that in Fig. 4 each of the angular bends indicates one of the heating elements indicated by one of the dotted lines extending substantially around the outer portion of the iron.

The means which I have provided for controlling the flow of electricity through the various coils consists of a thermostat. Any suitable form of thermostat may be used but I prefer for the purpose the thermostat comprising a cylindrical vessel 10 having corrugated or fluted sides, the flutes being spiral or circular as may be desired; and the walls of the vessel being sufficiently thin to allow the fluted sides to expand and contract longitudinally under reasonable pressures; the flutes, however, preventing transverse expansion or contraction. The vessel 10 is filled with any suitable fluid, preferably a liquid. Any suitable liquid may be used, the kind of liquid depending more or less upon the range of temperature to which it may be desired to limit the iron. I prefer for the purpose the turpentine 11. It will be obvious that, with the cylinder substantially filled with liquid and with the ends thereof closed and hermetically sealed by the end plates 12 and 13, as the liquid is heated the vessel will expand in length, and particularly as soon as the temperature is in the neighborhood of its boiling point under ordinary atmospheric pressure.

The vessel 10 may be mounted in the iron in any suitable position and manner. I prefer to mount it in the chamber 14 in the central portion of the iron, as indicated in the drawings, with the end plate 12 free to move longitudinally in the chamber. The plate 12, however, is fixed by means of rods 16, to a plate 17 slidably mounted in the chamber but adjustably held therein by means of the screw 18 which is rotatably fixed to the plate 17 and is threaded into the end piece 20 of the iron by means of the bushing 21 or in any other suitable manner. By this arrangement the end plate 12 will normally be held stationary in the chamber 14 but the end plate 13 will be free to move longitudinally in the chamber in accordance with the expansion or contraction of the vessel 10 due to variations in temperature of the liquid 11.

Fixed to the plate 13, but insulated therefrom, is a contact member 22, and fixed to the member 22 is one terminal of a flexible electrical conductor 23, the other terminal 19 of which is suitably connected to one of the terminals 24 of the iron; the terminals 24 being adapted to be connected with the electric feed wires in any suitable or ordinary manner. Other suitably insulated contact members 25, 26, 27, 28, 29 and 30 are mounted in the wall of the chamber 14 so as to be in contact with the member 22, as this member moves along the chamber; and the terminals of the various heating coils of the iron are suitably connected to the contacts 25 to 29, as indicated in Fig. 4, so that the movement of the contact 22 along the other contacts will decrease or increase the flow of electricity through the coils of the iron as may be desired.

The main heating element 31 has one of its terminals 32 connected with one of the external terminals 24, and has its other terminal 33 connected with the contact member 25. Hence, when the contact 22 is in contact with the member 25, the flow of electricity will be through the heating element 31 only, and, as will be seen, the iron will then be receiving the greatest amount of heat from the coils. If the temperature of the iron rises above the predetermined maximum amount, the expansion of the vessel 10 will cause the contact 22 to pass from contact 25 to contact 26 and the electric current will then flow through the heating element 34 which connects contacts 26 and 25. As a consequence, the increase of resistance to the flow will decrease the total amount of heating due to the current, and the tendency of the temperature of the iron to rise will be more or less overcome. If, however, the temperature continues to increase, the contact 22 will pass off of contact 26 on to contact 27, and the current will flow through coil 35, still further reducing the heating tendency of the iron. This process will be repeated if the iron still continues to increase in temperature, until finally the contact 22 passes off contact 29 and on to contact 20, when the flow of electricity will entirely cease. The iron will then necessarily cool until the contact 29 is again reached by the contact 22, when the heating current will again flow. On the other hand, if by constant use of the iron or otherwise, when the contact 20 has moved a material distance away from the contact 25, the contraction of the vessel 10 will cause the contact 22 to move toward the left until sufficient current is flowing to maintain properly the temperature of the iron under the cooler working conditions. It is, of course, understood that the heating coils and all other parts are suitably insulated.

Inasmuch as it is not ordinarily desired to use the sad iron unless the temperature is from 100 to 200 degrees above the temperature of the room, it is not necessary to have the vessel 10 contract more than it would when at such temperatures; and as such unnecessary contraction would make necessary a much longer contact 25, and unnecessary springing of the walls of the vessel, I provide means for limiting the amount of the contraction of the vessel 10. Any suitable means may be provided for this purpose, but I prefer the nuts 36 threaded on to the rods 16, which prevent the plate 13 from moving toward the left farther than the desired point; and by adjusting the position of these nuts on the rod 16 the maximum contraction of the vessel 10 is limited as much as may be desired.

Also, if desired, a spring 37 may be inserted within the rods 16 and between the plates 13 and 17 which will assist in the contraction of the vessel 10. Also any suitable means may be provided for keeping the contact 22 at all times snugly against some one of the contacts 25 to 30. The means which I prefer for this purpose comprises a wedge-shaped plate 40, mounted with its thick edge upwardly on the plate 13. As the vessel 10 is raised somewhat from the bottom of the chamber 14 and held in this position by the slanting surface of the member 40 and the slanting wall 41 of the chamber 14, plate 13 will be forced toward the contacts 25 to 29, and the contact 22 will always be held snugly against one of the other contacts. At the same time the contiguous surfaces of the contacts are also beveled as indicated in Fig. 3 and this assists in supporting the vessel 13 and in keeping the contacts together. In this manner the use of springs is avoided, springs being more or less objectionable, especially where the temperature is high.

In order to adjust the maximum temperature of the iron it is necessary only to turn the screw 18 one way or the other so as to shift the vessel 10 longitudinally in the chamber 14. If the vessel is shifted to the right the contact will thus be moved farther to the right along the contacts 25 to 30, and hence the maximum heating possible will be reduced.

I claim as my invention:

1. Means for controlling the temperature of an electrically heated device comprising a hermetically sealed vessel having resilient walls and containing a fluid, one end of said vessel being fixed, a plurality of electric heating coils mounted in said device, and means operatively connecting the free end of said vessel with said coils for varying the length of the coils in series as the vessel expands or contracts under the varying temperature of said vessel.

2. Means for controlling the temperature of an electrically heated device comprising a hermetically sealed vessel having resilient walls and containing a fluid, one end of said vessel being fixed, a plurality of electric heating coils mounted in said device, means operatively connecting the free end of said vessel with said coils for varying the length of the coils in series as the vessel expands or contracts under the varying temperature of said vessel, and means for adjusting the position of the fixed end of said vessel with reference to said device.

3. A temperature controller comprising a casing, a plurality of electric heating coils, mounted in said casing, a row of electric contacts fixed in said casing, each pair of adjacent contacts being connected by one of said coils, a movable electric contact mounted in said casing, means operable by the varying temperature of said casing for moving said movable contact along said row of contacts, means for connecting said movable contact to a source of electric energy, and means for connecting one of said fixed contacts to the said source of energy.

4. A temperature controller comprising a casing, a plurality of electric heating coils, mounted in said casing, a row of electric contacts fixed in said casing, each pair of adjacent contacts being connected by one of said coils, a movable electric contact mounted in said casing, means operable by the varying temperature of said casing for moving said movable contact along said row of contacts, means for connecting said movable contact to a source of electric energy, means for connecting one of said fixed contacts to the said source of energy, and means operable by gravity for holding said movable contact snugly against said row of fixed contacts.

5. In a sad iron having a chamber therein, a plurality of electric heating wires embedded in said iron, a thermostat being mounted in said chamber, one end of said thermostat being fixed, means connected with the free end of said thermostat for varying the heating effects of said wires, and means for varying the position of said fixed end of said thermostat with reference to said chamber.

6. In a sad iron, a thermostat comprising a hermetically sealed chamber having longitudinally yielding sides and containing a fluid, one of the ends of said thermostat being fixed, means operatively connected with the other end of said thermostat for controlling the temperature of said iron, and means limiting the longitudinal contraction of said thermostat.

7. In a sad iron, a thermostat comprising a hermetically sealed chamber having longitudinally yielding sides and containing a fluid, one of the ends of said thermostat being fixed, means operatively connected with the other end of said thermostat for controlling the temperature of said iron, means limiting the longitudinal contraction of said thermostat, and resilient means tending to shorten said thermostat.

In testimony whereof, I hereunto set my hand.

FRED J. PETROVICS.